United States Patent
Bak et al.

[19]

[11] Patent Number: 5,965,993
[45] Date of Patent: Oct. 12, 1999

[54] SYSTEM FOR CONTROLLING THE OPERATION OF REVERSIBLE MOTOR-SPEED REDUCER MODULES FOR ADJUSTING IN POSITION ELEMENTS OF MOTOR VEHICLE SEAT STRUCTURE

[75] Inventors: Philippe Bak, Valentigney; Pierre Laporte, Nogent Sur Vernisson, both of France

[73] Assignee: Ecia-Equipements et Composants pour l'Industrie Automobile, Audincourt, France

[21] Appl. No.: 08/942,362

[22] Filed: Oct. 2, 1997

[30] Foreign Application Priority Data

Oct. 4, 1996 [FR] France ................................ 96 12143

[51] Int. Cl.$^6$ ........................................... H02P 1/00
[52] U.S. Cl. ........................ 318/280; 318/65; 318/34; 318/54; 318/286; 318/266
[58] Field of Search ................................ 318/65, 280, 34, 318/54, 286, 266

[56] References Cited

U.S. PATENT DOCUMENTS

| | | |
|---|---|---|
| 4,267,494 | 5/1981 | Matsuoka et al. . |
| 4,698,571 | 10/1987 | Mizuta et al. . |
| 4,808,897 | 2/1989 | Saito et al. . |
| 4,809,180 | 2/1989 | Saitoh . |
| 5,140,235 | 8/1992 | Ahmed et al. . |
| 5,406,270 | 4/1995 | Van Lente . |

FOREIGN PATENT DOCUMENTS 3836019  4/1990  Germany .

*Primary Examiner*—Karen Masih
*Attorney, Agent, or Firm*—Sughrue, Mion, Zinn, Macpeak & Seas, PLLC

[57] ABSTRACT

This system for controlling the operation of reversible motor-speed reducer modules for adjusting in position elements of a motor vehicle seat structure is characterized in that the motor-speed reducer modules (1,2) are connected in parallel to common supply means (3), whose output voltage direction is piloted by a control module (4), and to this control module (4) through a multiplexed network (5) for the transmission of data piloting said motor-speed reducer module to permit the actuation or non-actuation, in one direction of rotation or the other, of each motor-speed reducer module (1,2) for adjusting in position each element of the seat structure.

14 Claims, 1 Drawing Sheet

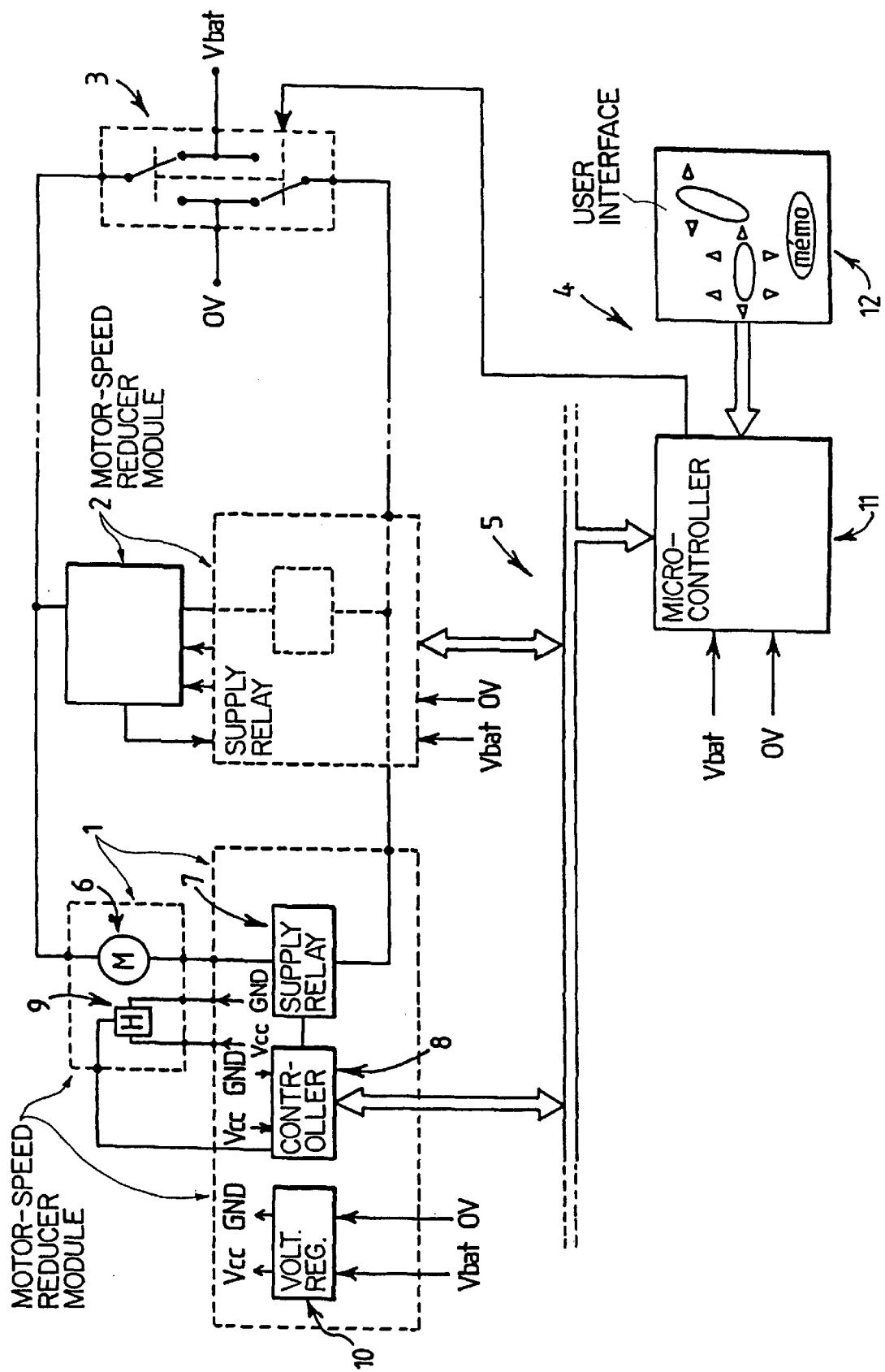

SYSTEM FOR CONTROLLING THE OPERATION OF REVERSIBLE MOTOR-SPEED REDUCER MODULES FOR ADJUSTING IN POSITION ELEMENTS OF MOTOR VEHICLE SEAT STRUCTURE

BACKGROUND OF THE INVENTION

1. Field of the Invention

The present invention relates to a system for controlling the operation of reversible motor-speed reducer modules for adjusting in position elements of a motor vehicle seat structure.

2. The Background Art

Such seat structures whose elements may be adjusted in position by means of electric motor-speed reducers are well known in the art and are usually called motorized adjustment seat structures.

Generally, each seat structure element is connected for example through motion-converting means to a motor-speed reducer which is disposed for example under the seat of the seat structure and whose operation, that is to say its power supply, is piloted by hand control means used by a user for adjusting the position of this seat structure element to his morphology.

Means for storing preestablished positions of the elements of this seat structure may also be associated with the control means to permit a rapid adaptation of this seat structure to the morphology of different successive users.

Generally, each motor-speed reducer is associated with its own control means comprising supply voltage inverting means pilotable by the user, for example to achieve operation of the motor-speed reducer in one direction or the other so as to adjust the position of the corresponding element of the seat structure in either direction.

It will be understood that this arrangement has a number of drawbacks, in particular owing to the large number of motor-speed reducers incorporated in a seat structure, which requires a large number of wires for actuating the motor-speed reducers, and limits the possibilities of adaptation of the latter to new developments or designs of seat structures.

SUMMARY OF THE INVENTION

An object of the invention is therefore to overcome these problems by proposing a system for controlling the operation of motor-speed reducer modules which is simple, reliable, uses only a limited number of wires and is easily adaptable to different seat structures.

The invention therefore provides a system for controlling the operation of reversible motor-speed reducer modules for adjusting the position of elements of a motor vehicle seat structure, characterized in that the motor-speed reducer modules are connected in parallel to common supply means, in respect of which the output voltage direction is piloted by a control module, and to said control module through a multiplexed network transmitting data for piloting the motor-speed reducers to permit the actuation or the non-actuation in one direction of rotation or the other, of each motor-speed reducer module for the purpose of adjusting the position of each element of the seat structure.

BRIEF DESCRIPTION OF THE DRAWING

A better understanding of the invention will be had from the following description, which is given solely by way of example with reference to the accompanying drawing which shows a block diagram illustrating the general arrangement of an embodiment of a control system according to the invention.

DETAILED DESCRIPTION OF THE INVENTION

As previously mentioned, the invention concerns a system for controlling the operation of reversible motor-speed reducer modules for adjusting the position of elements of a motor vehicle seat structure.

As the incorporation of such motor-speed reducer modules within or under a seat structure is well known in the art, it will not be described in more detail hereinafter.

It will merely be mentioned that these motor-speed reducers are connected to mechanisms for shifting the seat structure elements and adjusting them in position.

In the FIGURE, a control system is shown which comprises two reversible motor-speed reducer modules, but it will be understood that a different number of modules may be envisaged.

These motor-speed reducer modules are designated by the general reference numerals 1 and 2 in this FIGURE.

The structure of these modules will be described in more detail hereinafter.

It will be noticed that these different motor-speed reducer modules are connected in parallel to common supply means, designated by the general reference numeral 3 in this FIGURE, in respect of which the direction or polarity of the output voltage is piloted by a control module designated by the general reference numeral 4 in this FIGURE.

The supply means 3 are connected to the power supply of the vehicle for example formed by the battery of the latter.

These motor-speed reducer modules are also connected to the control module 4 through a multiplexed network transmitting data piloting the motor-speed reducer modules, this multiplexed transmission network being designated by the general reference numeral 5 in this FIGURE.

It will therefore be understood that the control module 4 permits, on one hand, controlling the direction of the output voltage of the common supply means 3 of the motor-speed reducer modules and, on the other hand, transmitting through the multiplexed network 5 data for piloting the motor-speed reducer modules to permit the actuation or non-actuation, in one direction or the other, of each motor-speed reducer module so as to adjust each element of the seat structure in position.

The multiplexed data transmission networks are well known in the art and there is no need to describe them in detail hereinafter.

There may be cited for example the networks of the VAN, CAN or I2C type.

These networks permit transmitting, for example on a data transmission bus comprising two data and complementary data wires, different data between the different stations connected to this network to which addresses are assigned in the conventional manner.

The particular structure of the control module 4 will be described in more detail hereinafter.

As can be seen in this FIGURE, each reversible motor-speed reducer module, such as for example the module designated by the general reference numeral 1 in this FIGURE, comprises a reversible motor-speed reducer designated by the general reference numeral 6, having a conventional structure and connected to an element of the seat structure.

One of the supply terminals of this motor is for example connected to one of the output terminals of the common supply means designated by the general reference numeral 3.

The other supply terminal of this motor is connected to means forming a supply relay for the motor, designated by the general reference numeral 7 in this FIGURE, itself being connected to the other terminal of the previously described common supply means 3.

Note that these means forming a relay may for example comprise an electromechanical relay or a semi-conductor switching means such as for example a triac.

The operation of these means forming a supply relay 7 permitting supplying power or not supplying power to the motor-speed reducer 6, is piloted by control means 8 of this motor-speed reducer module 1, these control means 8 being connected to the data transmitting multiplexed network 5.

These control means 8 comprise for example any suitable data processing unit comprising a bus interface and enabling a data exchange to be effected between the motor-speed reducer module 1 and the control module 4, through the multiplexed network 5 for controlling the means forming a supply relay of the corresponding motor-speed reducer.

These control means 8 are also connected for example to a position sensor for detecting the position of the corresponding element of the seat structure.

In the embodiment shown in the FIGURE, this position sensor is associated with the motor-speed reducer and is designated by the general reference numeral 9 in this FIGURE.

This position sensor may be for example a Hall effect sensor.

Other embodiments of this sensor may of course be envisaged.

In the conventional manner, this module 1 is supplied with power by means designated by the general reference numeral 10 in the FIGURE and connected to the power supply of the vehicle and delivering a regulated voltage Vcc.

In the illustrated embodiment in which the position sensor is a Hall effect sensor, the latter is also supplied with power by these means.

The structure of the motor-speed reducer module 2 is similar to that of the motor-speed reducer module 1 just described, and it will be understood that these motor-speed reducer modules are therefore connected in parallel to the common supply means 3 and to the control module 4 through the multiplexed data transmission network 5.

The common supply means 3, in respect of which the direction of the output voltage is piloted by the control module 4, may also have any suitable structure, for example include inverting relays or semi-conductor switching means.

The operation of these supply means is piloted, as mentioned before, by the control module 4 to ensure the desired output voltage direction of the supply means and therefore the direction of the supply voltage of the motor-speed reducer modules, to permit the corresponding motor-speed reducers to rotate in one direction or the other and therefore permit an adjustment in one direction or the other of each seat structure element associated with each motor-speed reducer module.

The control module 4 may have different suitable structures.

In the illustrated embodiment, the control module 4 comprises a data processing unit, for example having a microcontroller, designated by the general reference numeral 11 in the FIGURE, connected to the multiplexed network 5 and associated with a user interface designated by the general reference numeral 12.

This interface comprises for example means for controlling the position of the elements of the seat structure, which may be manipulated by a user and constituted for example by push buttons, but also means for storing at least one preestablished position of the elements of the seat structure.

Such an interface structure is known in the art and for example the user to actuate push buttons controlling the position of the elements of the seat structure or to actuate storage means in which the user has previously stored positions of the elements of the seat structure which correspond to his morphology.

It will therefore be understood that, generally, the control module 4 is connected through a data transmission multiplexed network 5 to the different motor-speed reducer modules 1, 2 associated with the elements of the seat structure, for transmitting thereto data for the actuation or the non-actuatio, while the supply of power to the motor-speed reducers is ensured by a voltage inverter common to all these motor-speed reducers, the actuation of which is piloted by the control module 4 to achieve, subsequent to the actuation of a control means for example by a user, a selective actuation of one of the motor-speed reducer modules in a given direction of rotation to permit an adjustment in the desired direction of the position of the corresponding element of the seat structure.

It will therefore be understood that this structure has a number of advantages, in particular as concerns the reduced number of wires required for the connection of these different modules and means.

Further, although the different motor-speed reducer modules are connected in parallel for example to the supply means 3, they may be in the form of modules which are interconnectible through for example suitable connectors, which permits very easily adapting the structure of the control system to the structure of the seat structure, in particular by adding or removing modules.

For some time there has been moreover an important development of the integration of data transmission multiplexed networks in motor vehicles and the control system according to the invention, by the use of a multiplexed network compatible with that of the rest of the vehicle, facilitates its integration and the management of its operation.

Lastly, the use of a data transmission multiplexed network between the control module and the motor-speed reducer modules permits achieving new functions such as for example the supervision of the operation of the motor-speed reducers and for example the monitoring of their correct operation so as to render this operation reliable, for example by avoiding any spread of a breakdown to the surrounding components.

What is claimed is:

1. System for controlling operation of reversible motor-speed reducer modules for adjusting in position elements of a motor vehicle seat structure associated with said modules, said system comprising in combination:

a common supply means connected in parallel to said motor-speed reducer modules and supplying an output voltage having a direction, a control module associated with said common supply means for controlling the direction of the output voltage of said common supply means, and a data transmission multiplexed network connecting said control module to said motor-speed reducer modules for controlling said motor-speed reducer modules so as to permit a selective actuation and non-actuation in a selected direction of rotation of each motor-speed reducer module for adjusting each element of said seat structure in position.

2. System according to claim 1, wherein each reversible motor-speed reducer module comprises a motor-speed reducer associated with means forming a supply relay for the motor-speed reducer, and control means associated with said motor-speed reducer and connected to said multiplexed network for controlling operation of said motor-speed reducer.

3. System according to claim 2, wherein said control means are connected to a position sensor for detecting the position of the corresponding element of said seat structure.

4. System according to claim 3, wherein said position sensor is associated with the corresponding motor-speed reducer.

5. System according to claim 3, wherein said sensor is a Hall effect sensor.

6. System according to claim 4, wherein said sensor is a Hall effect sensor.

7. System according to claim 2, wherein said means forming a supply relay for said motor-speed reducer comprise a triac.

8. System according to claim 2, wherein said means forming a supply relay for said motor-speed reducer comprise an electromechanical relay.

9. System according to claim 1, wherein said control supply means comprise a voltage inverter connected to a power supply of said vehicle.

10. System according to claim 1, wherein said control module comprises a data processing unit connected to said multiplexed network and to a user interface provided with means for controlling the position of said elements of said seat structure which may be manipulated by a user.

11. System according to claim 10, wherein said control module comprises means for storing at least one preestablished position of said elements of said seat structure.

12. System according to claim 10, wherein said data processing unit comprises a micro-controller.

13. System according to claim 11, wherein said data processing unit comprises a micro-controller.

14. System according to claim 1, wherein said multiplexed network is selected from the group comprising CAN, VAN and I2C networks.

* * * * *